J. C. PLUMER.

Spoke-Socket.

No. 51,620.                                      Patented Dec 19, 1865.

J C Plumer

2 Sheets—Sheet 2.

J. C. PLUMER.
Spoke-Socket.

No. 51,620.  Patented Dec 19, 1865

Witnesses:
William H. Clifford
E. G. P. Smith

Inventor.
J. C. Plumer

UNITED STATES PATENT OFFICE.

J. C. PLUMER, OF BOSTON, MASSACHUSETTS.

IMPROVED FELLY-CLAMP AND SPOKE-SUPPORT FOR CARRIAGE-WHEELS.

Specification forming part of Letters Patent No. 51,620, dated December 19, 1865.

*To all whom it may concern:*

Be it known that I, J. C. PLUMER, of Boston, in the Commonwealth of Massachusetts, have invented a new and useful improvement in the manner of securing spokes to the fellies of wheels; and I do hereby declare the following to be a full and exact description of the same, reference being had to the accompanying drawings, making part of this specification, in which—

Figure 1:
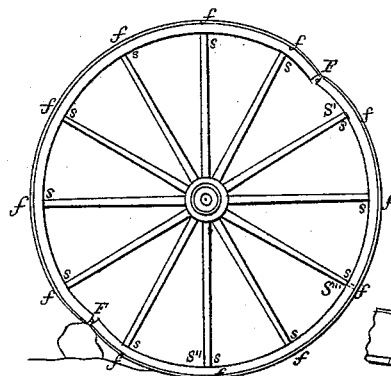
Figure 6:
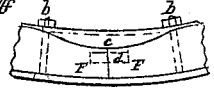
Figure 2:
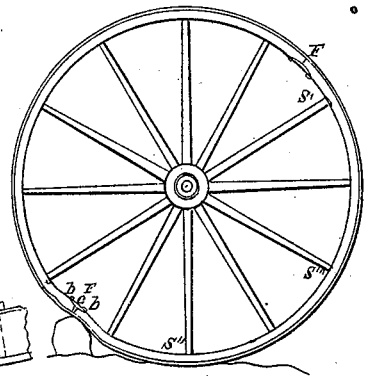
Figure 3:
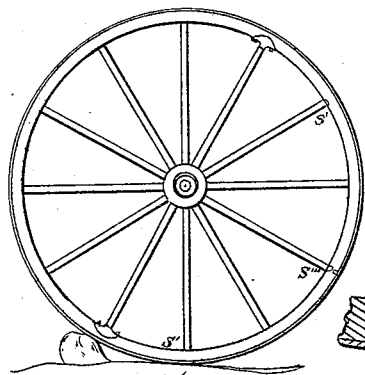
Figure 7:
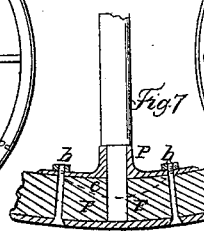
Figure 4:
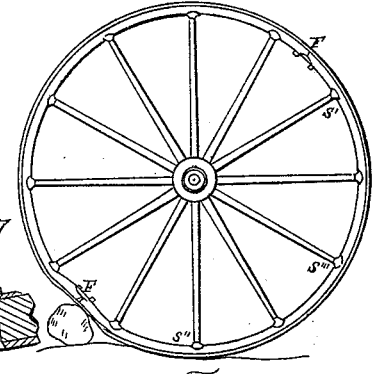
Figures 5, 8:
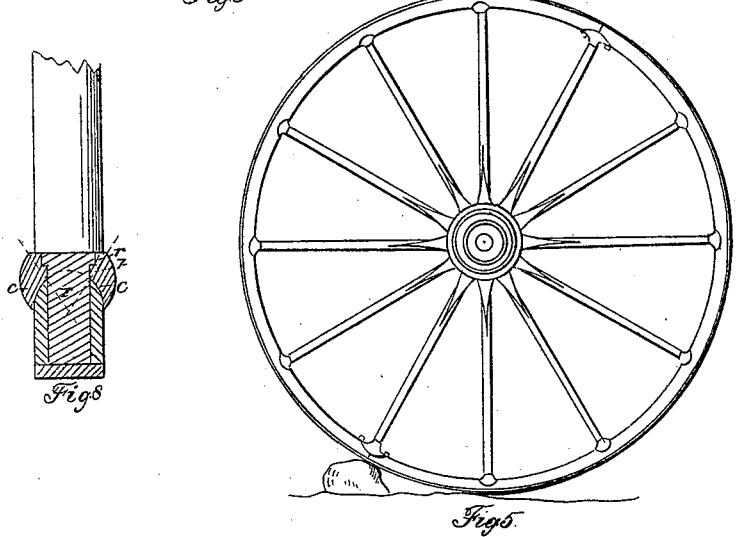
Figure 9:
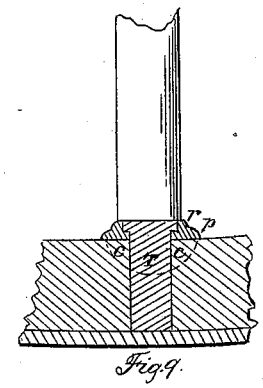
Figure 1:
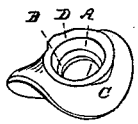
Figure 2:
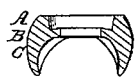
Figure 3:
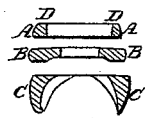
Figure 4:
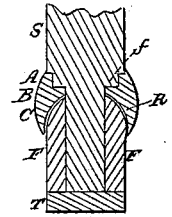
Figure 5:
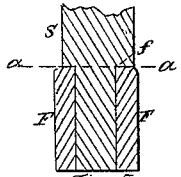
Figure 6:
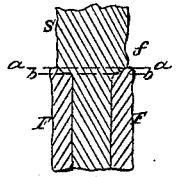
Figure 7:
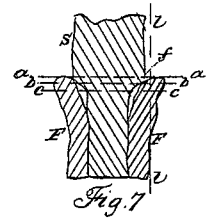
Figure 8:
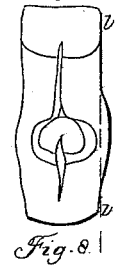
Figure 9:
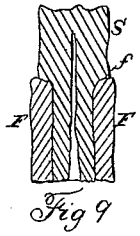
Figure 10:
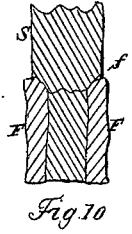
Figure 11:
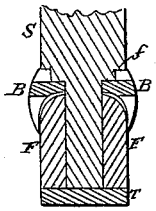
Figure 12:
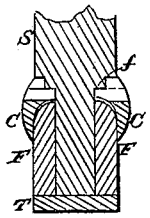
Figure 13:
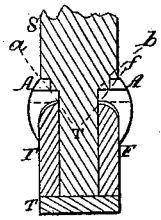

Figure 1 represents a view of my improved felly-clamp and spoke-support; Fig. 2, a vertical transverse section of Fig. 1; Fig. 3, a division of the same, showing the parts of which it is composed; Fig. 4, a vertical cross-section of the application of the device to the joint of the spoke with the felly, showing a packing of rubber or other elastic material, R; Fig. 5, a vertical cross-section of the joint of the spoke with the felly as commonly constructed, the shoulder $f$ of the spoke $s$ resting upon a narrow circular space on the upper side of the felly F F. Fig. 6 is as in Fig. 5, showing how the shoulder of the spoke has by concussion in use or by setting the tire too tightly become depressed or driven into the upper side of the felly from the line $a\,a$ to $b\,b$, thus practically shortening the spoke of the wheel or radius of the circle, and at the same time the shoulder of the spoke has become bruised and battered by pressure and concussion against the upper surface of the felly. Fig. 7 shows the splitting of the felly by the spoke being driven into it after the shoulder thereof has been bruised and worn. In this case the shoulder of the spoke has become thrust still farther into the felly to the line $c\,c$, thus rendering the spoke still shorter and the rim or felly felly relatively longer, producing the condition termed "rim-bound." Besides, the portions of the felly adjacent the spoke are wedged or pressed out beyond the line $b\,b$, and, becoming worn off, further weaken the part. Fig. 8 shows a portion of the felly split and spread apart by the forcing of the shoulder of the spoke into and through it; Fig. 9, a joint, in which the tenon of the spoke has been split; Fig. 10, the same, in which it has been broken; Fig. 11, a view of the shoulder of the spoke resting upon the plate portion B of my invention, which serves to prevent being driven into the felly; Fig. 12, a view of the felly clamped at its joint with the spoke by the clamping portion $c$ of my invention, to prevent its splitting. Fig. 13 shows the lower shoulder of the spoke encircled by the ring portion of my invention, to prevent splitting, fracture, or bruising thereof, and also supporting the upper shoulder of the spoke.

Fig. 1, Sheet No. 1, represents a carriage-wheel of ordinary construction, the rim or felly consisting of two semicircular portions forming the two felly-joints, F F, which, as well as the twelve spoke and felly joints, $s\,f$, are unprotected by any method whatever.

Fig. 2, Sheet No. 1, represents the same as Fig. 1, with the application to the felly-joints F F of the ordinary felly-clip $c$, secured by the bolts $b\,b$.

Fig. 3, Sheet No. 1, represents a carriage-wheel with two of the spokes inserted over the felly-joints, which are provided with a modification of the common clip, consisting in a perforation and an annular projection from its upper surface for the reception of the tenons of the spokes, the junction of the remaining spokes with the rim or felly being unprotected from effects of wear, (shown at $s'\ s''\ s'''$.)

Fig. 4, Sheet No. 1, represents a carriage-wheel with the common clip applied to the felly-joints F F, and my improvement at the spoke and felly joints throughout the wheel.

Fig. 5, Sheet No. 1, represents the same as Fig. 4, with the substitution of the modified clip applied in conjunction with the two spokes, as explained in Fig. 3.

Fig. 6, Sheet No. 1, shows a section of a felly-joint with the common clip applied; $c$, the clip; $b\,b$, the bolts; $d$, the dowel.

Fig. 7, Sheet No. 1, shows a section of a felly-joint with the modified clip applied.

Figs. 8, and 9, Sheet No. 1, show, respectively, transverse and longitudinally sections of my improvement as applied to spoke and felly joints, showing the ring portion $r$, for supporting the outer shoulder of the spoke, and encircling the inner, the plate or shoulder portion P, for supporting the inner shoulder of the spoke and encircling the tenon T and the clamping part $c\,c$, for clamping the rounded upper surface and sides of the felly or rim.

The object of my invention is to produce a joint or connection of the spokes with the fellies of carriage-wheels which shall be more rigid and unyielding in its different parts, and therefore more permanently durable than those of common construction.

My invention consists of a metallic device constituted of three distinct parts, each of which is designed to accomplish separately a different purpose and other purposes in combination: first, the ring portion A, Figs. 1, 2, 3, and 4, designed to closely encircle the lower shoulder of the spoke and to support the upper shoulder, as in Figs. 4 and 13, and to keep the lower shoulder in position and prevent its contusion, as in Figs. 6 and 7, or splitting or fracture of the tenon thereof, as in Figs. 9 and 10; second, the plate portion B, Figs. 1, 2, 3, and 4, concave on its under surface, where it rests upon the upper convex surface of the felly designed to afford the lower shoulder of the spoke an even and unyielding support and prevent its being thrust against the upper surface of the felly or driven into it, as in Figs. 6 and 7, thus distending and splitting the felly, as shown in Figs. 7 and 8; third, the clamping portion or clasping part C, Figs. 1, 2, 3, and 4, designed to gripe the sides and upper surface of the felly at its joint with the spoke and prevent splitting thereof, as shown in Figs. 7 and 8.

The ring and plate portion combined constitute a mortise or socket for the reception of the lower shoulder of the spoke, admitting of the tenon proper of the spoke being made much smaller than common, so that a much smaller hole is required in the felly for its reception, thereby adding to its strength in this respect.

The clamping portion, in concert with the plate portion, prevents the contusion of the upper surface of the felly through the pressure of the shoulder of the spoke.

Further, the operation of the clamping portion in connection with the plate portion, through the pressure communicated by the shoulders of the spoke upon the upper portions of the device, tends to compress the portions of the felly F F, Fig. 12, against the tenons T of the spoke S in the direction of the lines $a$ T $b$ T, Fig. 13, and keep the joint always tight and firm, so that the contusion which the part receives by use, as well as the tension the wheel is subjected to in setting the tire, both tend to render the joint more compact and solid, rather than spread and split it apart, as shown in Figs. 7 and 8, as in the case of those of wheels of the ordinary construction, as shown in Fig. 5.

Spokes have heretofore been secured to the felly by insertion in a hole bored for their reception the shoulder of the spoke resting on a small space on the inner side of the felly around the hole. By thus thrusting one piece of wood into or against another, with the ends of the grains of one pressing upon the side of the grains of the other a very yielding and imperfect joint is formed, and one liable to be soon out of repair, inasmuch as the surface of the felly on which the shoulder of the spoke is supported is very small and liable to become depressed by setting the tire and by the concussion the wheel is subjected to in use, especially while the felly is saturated and softened by wet. Through the subsequent shrinkage of both the spoke and felly the joint becomes loose, and by the sifting in of sand and the play of the spoke the hole in the felly is worn larger, while the spoke is worn smaller, and the shoulder thereof is worn entirely away. The spoke thus worn away and becoming pointed by the shoulder being worn off, is gradually thrust into the felly, splitting and destroying it. Another result of the wearing of the joint of the spoke with the felly is that the spoke, by being pressed or driven into the felly, becomes practically shortened, allowing the joint of the opposite spoke to become loose. The spokes representing the diameter or radii of the circle or felly becoming thus practically shortened, a condition of the wheel known as "rim-bound" is produced, in which the felly or periphery of the circle is relatively too long, destroying the tension at the joints, requiring the removal of the tire and shortening of the felly by sawing out portions at the joint of one felly with another, an expensive repair and inefficient in restoring the wheel to its original perfection. The effects of wear and contusion against stones and the like are shown in the straightening or setting in of the felly-joints and the contusion of the upper surface of the felly and the split and broken spokes. These are illustrated at F and $s'$ $s''$ $s'''$, Figs. 1, 2, and F, Fig. 3.

I am aware of the existence of patents numbered 26,447, 30,479, 30,915, 31,309, 31,462, 32,946; but all of these are dissimilar to my invention, the first-named receiving the tenon of the spoke in a ferrule, which, passing through the felly, is attached to a plate welded on the inner surface of the tire. The second has in view a different purpose—viz., protecting the joint of one felly with another, and not applicable to the joints of the spoke with the felly, nor does the tenon of the spoke pass through to touch the tire. The next has also in view a different purpose—viz., perfecting the joints of one portion of a felly with another. In the next the difference consists in this, that the ferrule passes through the felly of the wheel, while in my invention the woody surfaces of the tenon and socket come in contact. The purpose of the last-named patented invention is different from mine—that is, to protect the joints of one portion of the felly with another, and is not applicable to all the joints of spoke and felly. In this, also, the shoulder of the spoke is supported by the inner side of the felly without the intervention of metal, as in my invention.

I construct my improved felly-clamp and spoke-support of either cast or forged iron, or other metal or material suited to the purpose, and of the required sizes for the different varieties of wheels. I apply my invention by fitting and securing the appropriate portion to the spoke and the adjusting the felly either with or without a packing of rubber or other suitable material, as required.

I do not claim the clip applied to the felly-joints of wheels, whether perforated to receive the spoke-tenon or provided with a tubular projection from either surface for the support or reception thereof, or any other device secured to the felly by bolts. Neither do I claim any methods of affixing the spokes at the felly-joints of carriage-wheels to prevent straightening or setting in thereof. Neither any method of securing the spokes to the fellies of wheels wherein the mortise in the felly is lined with a metallic tube, thimble, or ferrule for the reception of the spoke-tenon. I do not claim any method wherein the tire is clamped or secured to the wheel by any device applied to or at the joint of spoke with felly. I do not claim a double mortise within the substance of the felly for the reception of the double tenon of the spoke.

What I claim as my invention, and desire to secure by Letters Patent, is—

1. The combined felly-clamp and spoke-support when provided with the perforated plate or inside shoulder and applied substantially as and for the purposes specified.

2. At the junction of spoke with felly, the combined double shoulders of spoke and spoke-support, as and for the purposes described.

3. The combination of the felly-clamp and spoke-support with an elastic packing at the joints of the spokes and fellies of carriage-wheels.

J. C. PLUMER.

Witnesses:
WILLIAM H. CLIFFORD,
E. G. P. SMITH.